United States Patent [19]
Fluck, Jr. et al.

[11] Patent Number: 4,710,969
[45] Date of Patent: Dec. 1, 1987

[54] CATV TESTING SYSTEM

[75] Inventors: Sydney Fluck, Jr., Milford, Pa.;
Marvin L. Milholland, Indianapolis, Ind.

[73] Assignee: Wavetek Corporation, San Diego, Calif.

[21] Appl. No.: 326,216

[22] Filed: Dec. 1, 1981

Related U.S. Application Data

[63] Continuation of Ser. No. 120,901, Feb. 12, 1980, abandoned.

[51] Int. Cl.$^4$ ............................................. H04B 17/00
[52] U.S. Cl. ......................................... 455/67; 455/4; 358/86
[58] Field of Search ............................ 455/3, 6, 67, 4; 375/10; 358/86, 139, 147; 324/57 SS, 57 PS; 178/69 A, 69 G; 179/175.3 R; 379/4, 5

[56] References Cited
U.S. PATENT DOCUMENTS

| | | | |
|---|---|---|---|
| 2,953,743 | 9/1960 | Desoer | 179/175.3 |
| 3,651,403 | 3/1972 | Fluck, Jr. | 455/3 |
| 4,207,431 | 6/1980 | McVoy | 455/67 |

OTHER PUBLICATIONS

Measurements on Directional Radio Systems with the K1005 Sweep Frequency Test Assembly—W. Veitl, 9/1976, Nachrichten Electronik, vol. 30, No. 9, pp. 213-215.

*Primary Examiner*—Jin F. Ng
*Attorney, Agent, or Firm*—Ellsworth R. Roston; Charles H. Schwartz

[57] ABSTRACT

Signal quality in a cable in a particular frequency range is monitored and analyzed without interfering with the cable reception of CATV signals. Carrier signals at a transmitter are modulated with a pair of pass signals separated in time by a television frame period. Preferably before the first pass signal in the pair, a series of digital signals is provided indicating the parameters of a frequency sweep which is initiated upon the occurrence of the second pass signal. These parameters include the sweep start frequency, the sweep frequency bandwidth, the sweep duration and the sweep repetition rate. A frequency sweep according to such parameters is produced when the second pass signal occurs. The modulated carrier signals are transmitted through the cable to a receiver coupled to the cable. The receiver demodulates the carrier signals and processes the series of digital signals to determine the sweep signal parameters. When the first pass signal occurs, the CATV television signals in the cable pass to the receiver. When the second pass signal occurs, the television signals in the next cable frame also pass to the receiver for subtraction from the first CATV signals. Since these two signals are substantially the same, they are canceled. When the second pass signal occurs, the receiver receives the frequency sweep from the transmitter. These signals are stored in a digital memory for recirculation to a display. In this way, the quality of a transmission medium is determined and displayed without affecting the television signal quality in the medium.

29 Claims, 4 Drawing Figures

CATV TESTING SYSTEM

This is a continuation of application Ser. No. 120,901 filed Feb. 12, 1980 now abandoned.

This invention relates to a system for monitoring the quality of transmission media such as cable television systems. More particularly, the invention relates to a system using data processing techniques, preferably digital, to enhance the precision and sensitivity of the monitoring operation.

Systems employing cable television are becoming increasingly important in the United States. Such systems employ coaxial cables to transmit television signals to receivers. Originally, such systems were limited to remote or inaccessible areas where television signals transmitted through the atmosphere could not be properly received. However, in recent years, cable systems have become popular in areas where reception of television signals through the atmosphere is satisfactory. In these areas, television signals are transmitted through cables to subscribers who wish to receive programs having enriched content. For example, for a moderate fee, subscribers can see sporting events and current movies. As the number of subscribers has increased, television systems employing cables as the transmitting medium have become of enhanced importance. These television systems receive through such cables signals for all of the different channels in the area. As a result, signals have a wide band of frequencies pass through the cables.

Various systems have been used to monitor the quality of the television signals in transmission media such as cable television systems. These systems have employed signals which have swept the frequencies through a particular frequency range. The sweep signals have been transmitted through the television cables from a transmitter to a receiver. The sweep signals have been received at the receiver and the characteristics of these sweep signals have been determined and displayed to indicate the quality of the transmission media throughout the frequency range of the sweep signals.

Generally, two types of systems have been used in the past to determine the quality of the television media. One of these systems has been considered to use "low-level sweeping". Such systems are advantageous because they provide sweep signals at relatively low amplitude levels, generally 30dB below the level of the cable television carrier signal. Since the sweep signal has a low amplitude level, it has provided relatively little interference with the cable television signal. However, it has also inhibited the detection and analysis of the sweep signal at the receiver. As a result, the system has poor resolution, even when equipment is used to track and analyze the sweep signal.

The second type of system has been considered to use "high-level sweeping". In this type of system, a sweep signal generally 15dB to 20dB above the carrier level is used. Because of this increased amplitude, improved accuracy and resolution can be obtained. However, the increased amplitude of the sweep signal has resulted in interference with the cable television signal at the subscriber's receiver. In order to minimize such interference, the sweep speed has been increased to minimize the time that the sweep signal is in any television channel. Furthermore, the sweep repetition has been set at three (3) to five (5) seconds so that interference will be random and hopefully not visible to the subscriber.

In order to compensate for detection of video modulation of the high level sweep signal, the detector bandwidth has been limited on a range of twelve (12) to fifteen (15) Kilohertz. This has reduced resolution of the sweep signal. Because of the reduction in the detector bandwidth, the sweep duration has been extended to at least two (2) or three (3) milliseconds in order for the frequency response of the sweep signal to be seen. Duration of such length in the sweep signal, particularly at high amplitude levels, has aggravated interference at the subscriber's receiver.

This invention provides a system which combines the advantages of "low-level sweeping" and "high-level sweeping" and eliminates the disadvantages of both systems of the prior art. As a result, the system of this invention is able to monitor the quality of transmission media such as cable television systems without interfering with the reception of television signals at a subscriber's receiver.

The system of this invention is able to operate at typical amplitude levels of only ten (10)dB above carrier levels. This reduced amplitude compared to high-level sweeping reduces subscriber interference. The system provides sweeps having a duration of only one-half (0.5) millisecond to one (1) millisecond. This reduced sweep duration also minimizes subscriber interference.

The system of this invention includes a detector with a bandwidth of approximately one hundred (100) kilohertz. This increased bandwidth tends to increase the resolution of the system. The system of this invention also includes a novel arrangement for storing, recovering and displaying the signals representing the response of the transmission media to the sweep signals. This has allowed the time between successive sweeps to be increased so as to minimize even further subscriber interference.

The system of this invention employs digital techniques to monitor the quality of signals such as television signals in the transmission media. The system provides a sensitive and precise comparison of the characteristics of the signals in the cable in progressive frame times and obtains only the difference between such signals. The signals remaining from the comparison constitute only the sweep signals passing through the transmission media. These sweep signals are in a form which can be easily recorded in a storage memory and recirculated for display on a video display such as a cathode ray tube. In this way, an accurate determination can be made as to the quality of the transmission media.

The system of this invention provides carrier signals and modulates the carrier signals with a pair of pass signals separated in time by a television frame and with a seies of digital signals. These digital signals indicate the parameters of a sweep signal having frequencies preferably in the television band. The parameters may include the start frequency of the sweep, the frequency bandwidth of the sweep, the duration of the sweep and the repetition rate of the sweep. The digital signals representing such parameters are preferably produced before the pass signals in the pair.

The modulated carrier signal is transmitted through the cable and is received at a receiver coupled to the cable. The receiver demodulates the carrier signal and processes the series of digital signals to determined the parameters of the sweep signal. When the first pass signal is produced, the signals in a time equal to the sweep duration are passed. Upon the production of the second pass signal, the signals provided in the cable one frame time later are compared with the signals stored in the cable in the previous pass. The differences between the compared signals are then stored. Hopefully such difference represents essentially the sweep signal since the signals in the successive frame times should be substantially identical.

The signals representing the sweep signal are converted to a digital form at the different frequencies in the sweep. The signals are stored in a memory and are recirculated from the memory and converted to an analog form. The analog signals are then introduced to a video display such as a cathode ray tube. In this way, the sweep signal can be displayed for a relatively long period of time until the reception of the next sweep without requiring that expensive tubes with long peristence phosphor be used.

As will be appreciated, the signals in the sweep preferably have frequencies in the television band. When sweep signals having such frequencies are provided, the signals provided in the successive frame times are television signals. These television signals in the successive frame times are cancelled when the signals passing through the cable in the successive frame times are compared. In this way, the sweep signals are recovered after passing through the cable. The characteristics of these recovered sweep signals indicate the quality of the transmission media such as the cable with respect to the passage of the television signals.

Figure 1:
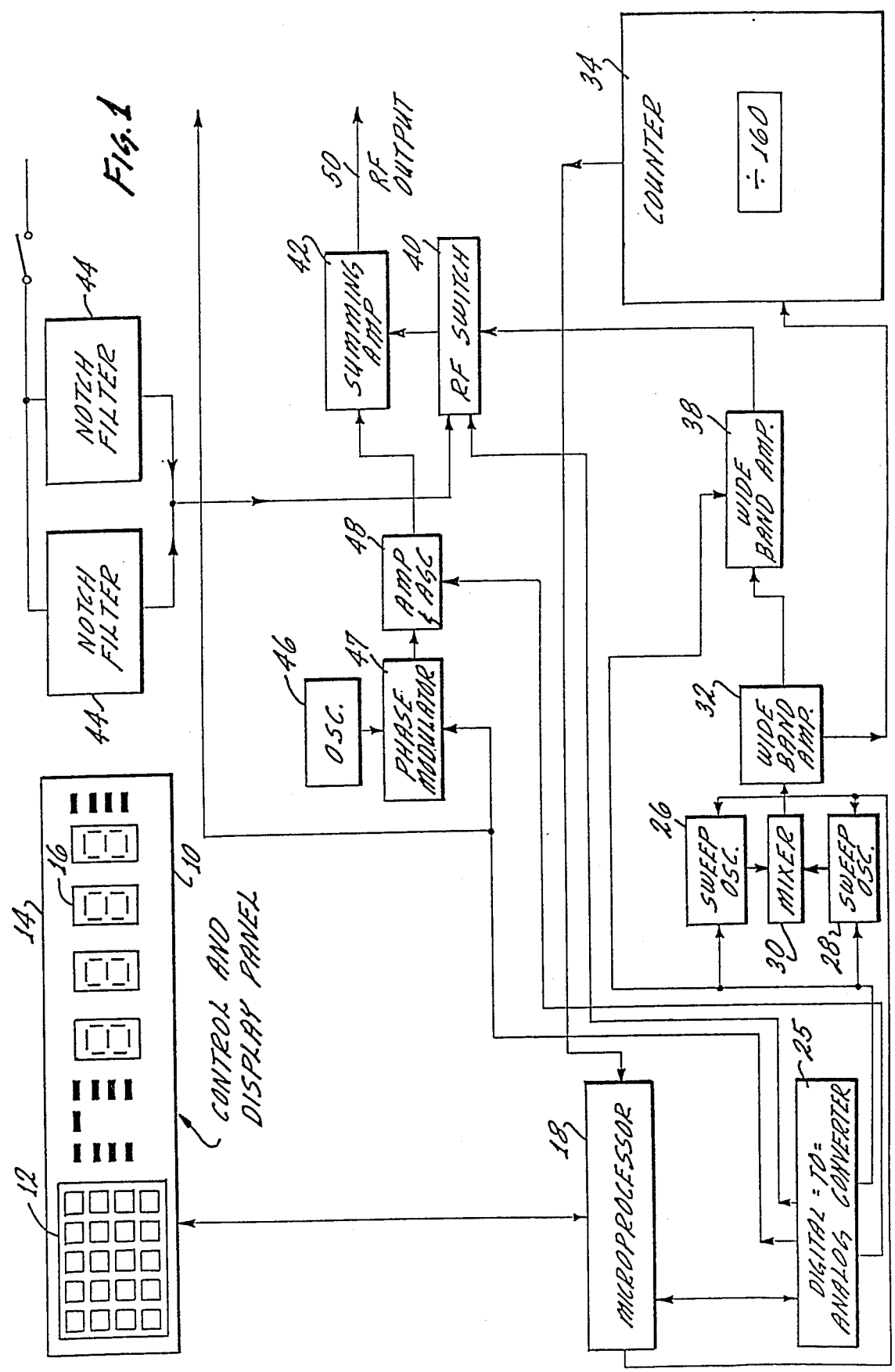
FIG. 1 is a schematic block diagram of a transmitter included in the system of this invention.

In one emboidment of the invention, a transmitter is provided. The transmitter includes a keyboard 10 which includes keys 12 for registering certain parameters controlling the characteristics of a sweep to be provided in the system. For example, the keys may control the start frequency of the sweep and the stop frequency of the sweep. The keys may also control the duration of the sweep. The keys may further control the repetition rate of the sweep. For example, the start frequency of the sweep can be as low as one (1) megahertz and the stop frequency of the sweep can be as high as four hundred (400) megahertz. The duration of the sweep may be as low as one (1) millisecond and the repetition rate can vary between one sweep per second to approximately one sweep every twenty five (25) seconds. The keys 12 are disposed on a display panel 14 which also includes visual displays 16 for indicating the parameters represented by the selected keys.

Figure 4:
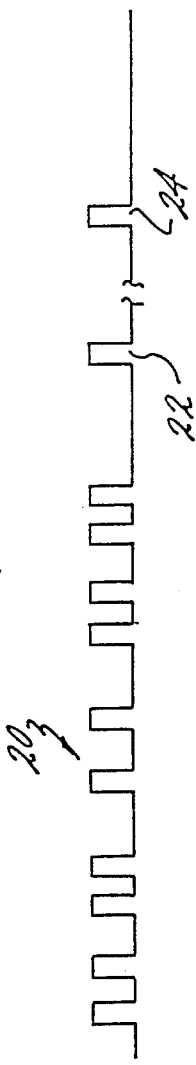
FIG. 4 is a schematic representation of a series of digital pulses and pass signals for controlling the production of a sweep signal by the receiver shown in FIG. 2.

The signals from the keys 12 and the displays 16 are introduced to a microprocessor 18 which processes the signals to convert the signal to a series of digital pulses. These pulses are shown in FIG. 4. The pulses in FIG. 4 may indicate in digital form the parameters selected for the sweep such as the start frequency, the stop frequency, the duration and the repetition rate. These pulses are illustrated on a schematic basis at 20 in FIG. 4.

The conversion of the signals 20 to a sweep voltage would be well known to a person skilled in the art in view of the following patents:

1. U.S. Pat. No. 4,168,527 issued to Dean A. Winkler on Sept. 18, 1979, for an "Analog and Digital Circuit Tester". Winkler provides a circuit tester having a plurality of programmable power supplies and programmable waveform testers. Instructions on a cassette tape dictate the desired values and wave shapes to be supplied to a particular module under test.

2. Sakamoto U.S. Pat. No. 3,978,411 issued on Aug. 31, 1976, for a "Sweep Output Generator Having A Frequency Modulated Local Oscillator For The Station Selector Of a Television Receiver". Sakamoto discloses a sweep generator and a keyboard 13 for controlling the stop frequency of the sweep generator.

3. Muehldorf U.S. Pat. No. 3,787,669 issued on Jan. 22, 1974, for a "Test Pattern Generator". Muehldorf discloses a general purpose comptuer which comprises a test pattern data source 32. The data source 32 generates a test pattern message in the form of a input data stream. A test pattern generator 34 responds to this data stream to generate a sequence of gating pulses over output lines 38. The gating pulses open selected ones of "and" gates 44. A signal pulse from a signal generator 40 is then conducted to desired input test points on a sample device 42 and a standard device 44.

4. Hondeghem U.S. Pat. No. 4,255,790 issued on Mar. 10, 1981, for a "Programmable Pulse Generating System". Hondeghem discloses a system for generating output pulses under the control of a programmable computer. The computer programs periods and subintervals and programs the characteristics of output waveforms to be produced in each sub-interval. A pulse generator produces signals in each sub-interval in accordance with the program provided by the computer.

5. Rose et al U.S. Pat. No. 4,104,725 issued on Aug. 1, 1978, for a "Programmed Calculating Input Signal Module For Waveform Measuring and Analyzing Instrument". In the Rose et al patent, a keyboard 20 provides user selection of a waveform display format. The user operated keys on the keyboard are connected to a processor 22 for programmed execution of selected functions on waveform data. For example, such functions may include the analysis and processing of particular waveform signals. For example, Fast Fourier Transforms, signal averaging and waveform correlations may be provided.

6. Neal et al U.S. Pat. No. 4,128,832 issued on Dec. 12, 1978, to Neal et al for a "Method and Means for Linearizing A Voltage Controlled Oscillator Sweep Generator". The output of a random access digital memory (RAM) is coupled to a digital-to-analog converter by six (6) data output lines. The output of the converter is coupled to an integrator. The integrator operates to convert into a ramp voltage step-like voltage increases generated by the random access memory. The ramp voltage controls the operation of a voltage controlled oscillator in generating a sweep signal.

In addition, the microprocessor 18 produces a pair of pass signals 22 and 24 separated in time by the duration of one frame, which period may constitute the duration of one frame on a television screen when United States standards are used. When foreign standards are used, the time separation between the passes signals 22 and 24 may be adjusted in accordance with the frame rate of the television signals in these foreign countries. The pass signals 22 ans 24 may be produced at any particular time in the frame. For example, the pass signals 22 and 24 may be produced at the occurrence of the vertical sync pulse in the successive frames. The pass signals 22 and 24 are preferably produced after the production of the digital signals representing the parameters of the sweep.

The transmitter system also includes a digital-to-analog converter 25 for converting the keyboard information into an analog form.

The operation of the converter 25 in converting the digital information to an analog form is under the control of the microprocessor 18.

This analog control information is introduced to a pair of oscillators 26 and 28, which are heterodyned and constructed to operate in a frequency-locked loop to maintain the frequencies of the associated oscillators at precise values. An analog ramp voltage obtained from the keyboard settings may also be introduced, in accordance with the operation of the microprocessor 18, to at least one of the oscillators to initiate the sweep of the signals from the oscillators upon the production of the pass signal 24 and to control the rate at which the frequency of one of the oscillators increases during the sweep. The increase in frequency may be obtained by increasing the frequency of the oscillators, heterodyning and filtering for the lower sideband.

The signals from the oscillators 26 and 28 are introduced to a mixer 30, which obtains the signals at the desired frequency and in turn introduces these signals to a wideband amplifier 32. The signals from the wideband amplifier 32 pass to a counter 34 which counts the number of signals in a particular time interval and introduces this number to the microprocessor 18. The microprocessor then adjusts the signals to obtain the desired start frequency. The microprocessor 18 also compares this number with counts preset in the microprocessor for the particular time interval in accordance with the start frequency, stop frequency and duration of the sweep. The microprocessor 18 then determines from such comparison if the frequency of the sweep signal corresponds to a desired value at progressive times in the sweep. If the comparison indicates an error, the microprocessor makes corresponding adjustments in the ramp voltage to maintain the frequency of the sweep at a proper value throughout the sweep. The microprocessor 18 also determines if the stop frequency corresponds to that represented by the pattern of the digital pulses 20 and makes corrections to be provided in the next sweep.

The signals from the wideband amplifier 32 are also introduced to a wideband amplifier 38, the operation of which is regulated to provide automatic gain control. The signals from the wideband amplifier 38 are then introduced through a radio frequency switch 40 to a summing amplifier 42. The operation of the radio frequency switch 40 may be controlled by notch filters 44 to inhibit the passage of signals at particular frequencies during the sweep in accordance with the operation of the notch filters 44. In this way, signals are prevented from passing to the summing amplifier 42 at precisely controlled and sharply defined frequencies which would interfere with other operations in the area.

The summing amplifier 42 also receives signals from an oscillator 46, phase-modulated as at 47, at a suitable carrier frequency such as fifty (50) megahertz. These signals are introduced through an amplifier 48 to the summing amplifier 42, which modulates the signals from the oscillator 46 with the signals from the wide band to provide an RF output as at 50. The modulated signals, amplifier, the pass signals 22 and 24 and the sweep signal are then transmitted through the coaxial cable included in the cable television system.

Figure 2:
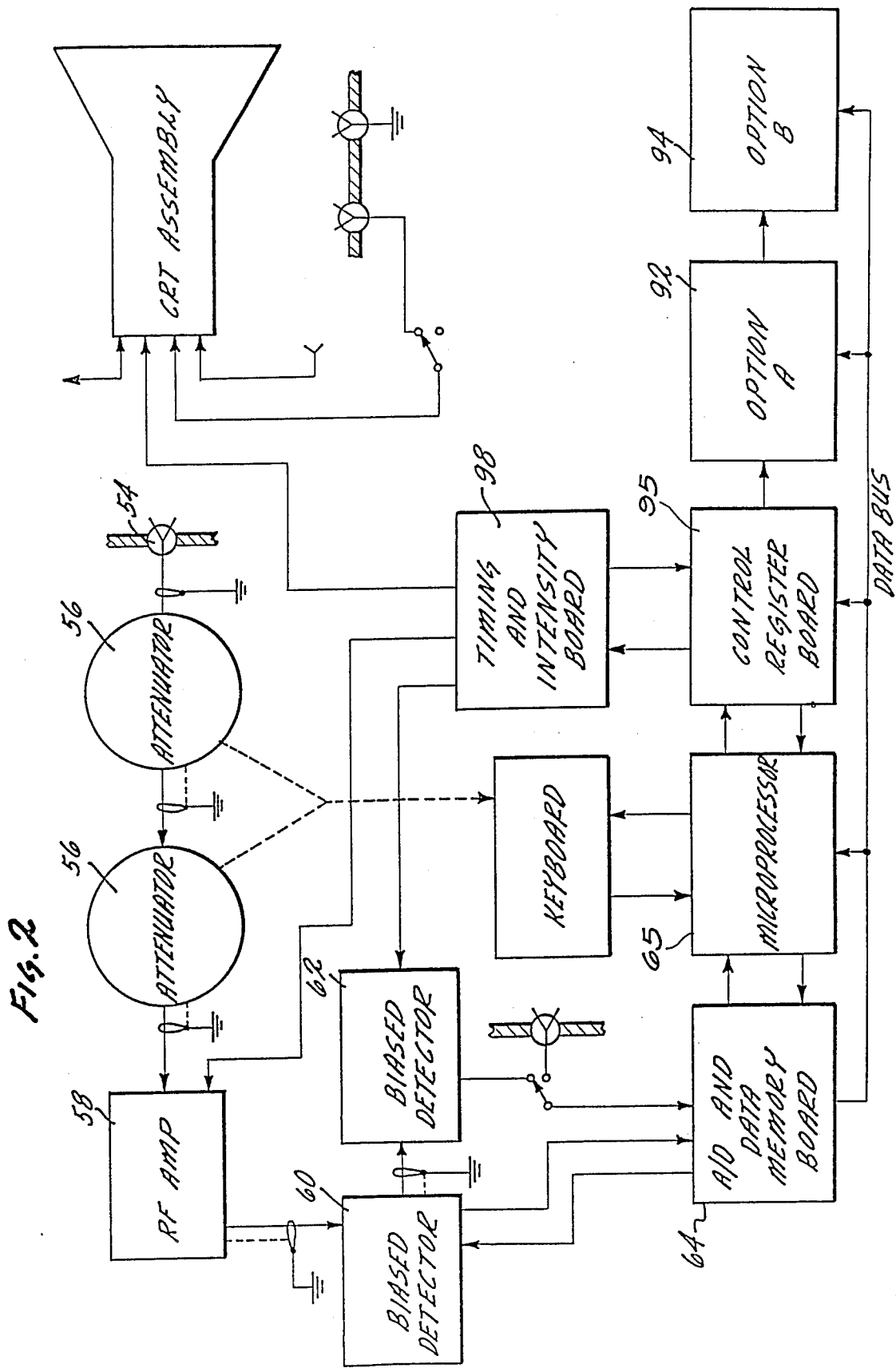
FIG. 2 is a schematic block diagram of a receiver included in the system of this invention.

The modualted RF signals are received at a receiver shown in FIG. 2. The signals pass from a cable 54 to attenuators 56 which operate to reduce background noise. The attenuators 56 may be adjustable in accordance with the operation of the data processor at the receiver to reduce such background noise. The signals are then amplified in a stage 58. Although the attenuators 56 are shown as separate stages they may be included in the amplifier 58.

The signals from the amplifier 58 are introduced to a biased detector 60 which provides an automatic gain control. The biased detection 60 operates to remove low frequency components and components representing slow bias drift. The biased detector 60 also operates to provide an amplitude level immediately prior to each sampling period and to maintain the amplitude level substantially constant at this level during the sampling period. The biased detector 60 selects the amplitude level immediately prior to each sampling period to compensate for changes resulting from temperature variations. The detector 60 may be constructed in a manner similar to that disclosed in detail in U.S. Pat. No. 3,651,403 issued to Sydney Fluck, Jr., on Mar. 21, 1972, for a "Simultaneous Sweep Testing System for CATVng" and shown particularly in FIG. 6 of that patent.

A sample of the signals at the detector 60 is introduced to a demodulator or biased detector 62 which demodulates the phase modulated signals to restore the pulses 20 and the pass signals 22 and 24 and the sweep signals. The pulses 20 and the pass signals 22 and 24 and the sweep signals are then introduced to a data memory board 64. The board 64 provides a check of the parity and sum of the pulses 20 to verify that the proper number of pulses are included for each of the different parameters such as the start frequency, the stop frequency, the duration of the sweep and the repetition rate of the sweep.

When all the checks of parity and sum have been satisfied, the board 64 processes the pass 1 signal 22 and the pass 2 signal 24 to provide a storage of information and a comparison of information in progressive frame times. This is provided by stages included in the data memory board 64 and shown in additional detail in FIG. 3. The stages shown in FIG. 3 include a pass signal sensor 66 which passes the pass signals 22 and 24 when all of the checks of parity and sum have been satisfied. The pass 1 signal 22 triggers a monostable multivibrator 68 from a first state to a second state. The monostable multivibrator 68 remains in the second state for a particular period such as a period of approximately 40 milliseconds. Since this is a period of time greater than the period of one frame when television signals are being received, the monostable multivibrator 68 remains in the second state during the times that the pass 1 signal 22 and the pass 2 signal pass through the sensor 66.

When the monostable multivibrator is triggered to the second state, it opens a gate 70 so that the signals in the cable 72 can pass through the gate.

These signals include the television signals in the cable 72 for the time frame between the pass signals 72 and 74.

These signals provide information for a first pass. The signals are introduced to a comparator 74 which operates to pass the signals without change. The signals are then amplified by a stage 76 and are introduced to an analog-to-digital converter 78, which may be constructed in a conventional manner to convert the analog information into a digital form. The digital signals are then stored in a memory 80, which may also be constructed in a conventional manner.

The pass 1 and pass 2 signals from the sensor 66 are also introduced to a monostable multivibrator 82. The pass 1 signal 22 triggers the multivibrator 82 from a first state to a second state and the pass 2 signal 24 triggers the multivibrator 82 from the second state to the first state. When the multivibrator 82 becomes triggered from the second state to the first state, it opens a gate 83 for the passage of the digital signals from the memory 80. These signals are converted to an analog form by a digital-to-analog converter 86, which may be constructed in a conventional manner.

The analog signals from the converter 86 are introduced to the comparator. Since the gate 70 is also open at this time, the signals provided in the cable 72 to represent the television information for the next frame time of the signals in the cable also pass to the comparator. The signals passing through the cable 72 in this next frame time also include the sweep signals generated by the transmitter shown in FIG. 1. The comparator 74 then compares the signals from the memory 80 and the signals from the cable 72 and passes only signals representing the differences between the compared signals. Since the signals in the memory 80 represent the television information for one frame time and the signals simultaneously passing through the cable to the comparator 74 represent the television information for the next frame time, the signals passing to the comparator and representing the television information in the two successive frame time should be substantially identical. As a result, substantially only the sweep signals pass through the comparator 74 since these signals are also included in the signals passing through the gate 70 after the production of the pass signal 24.

These sweep signals are converted to a digital form and are stored in the memory 80 to replace the information previously stored in the memory in representation of the information for the first frame.

The signals in the memory storage 80 can be introduced to a relatively permanent type of memory such as a card or tape. This information storage can be provided in stages 92 and 94 respectively designated as Option A and Option B. The information stored on a semipermanent basis on cards or tapes can be introduced to a central processing station. This station has the capabilities of processing the signals to determine the quality of the signals and, therefore, the quality of the transmission media. The data processing system also has the capabilities of determining deterioration in the operation of individual stags or slight detunings in the operation of individual stages in the transmission media such as the cable system. In this way, the operation of the cable system can be maintained at an optimal level without disrupting service to subscribers, particularly when the cable system passes television signals to the subscriber.

Figure 3:
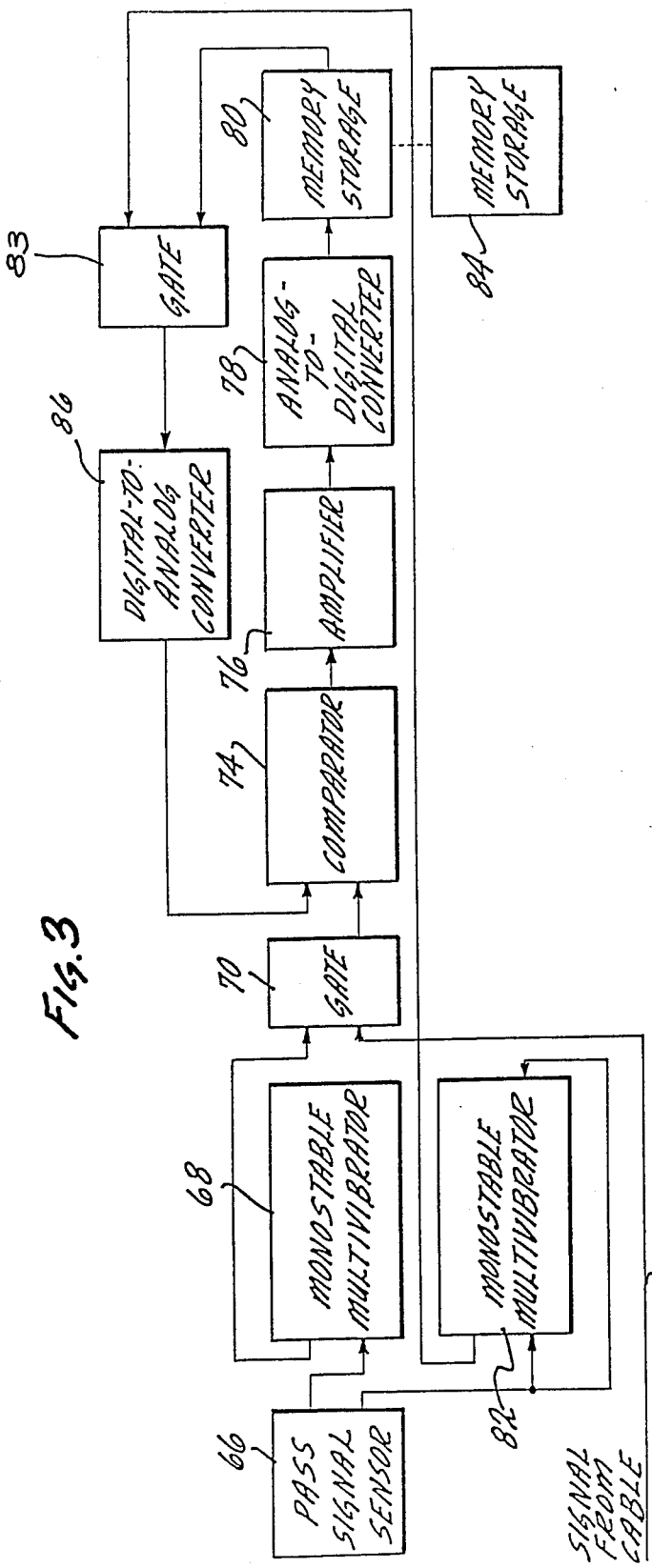
FIG. 3 is a schematic block diagram showing the construction in additional detail of certain of the stages included in the receiver of FIG. 2.

Although the system shown in FIGS. 2 and 3 has been described as providing in the storage 80 the sweep signals for a sample interval, a memory storage 84 associated with the memory storage 80 can actually be programmed to provide a composite signal on a weighted basis of the sweep signals in a number of previous sweeps. For example, the signals in the memory storage 84 can actually beweighted in the following manner:

$$X_{s(n)} = 0.25 X_{in(n)} + 0.75 X_{s(n-1)},$$

where
$X_{s(n)}$ = the new signals to be stored in the memory storage 84;
$X_{in(n)}$ = the signals in the memory 80; and
$X_{s(n-)}$ = the signals presently stored in the memory storage 84.

When such weighting occurs, the signals in the memory storage 84 may be introduced to the comparator 74, instead of the signals from the memory storage 80, to provide a comparison with the signals passing through the cable 72 in the next sample time.

In this way, noises in the sweep signals passing to the memory storage 84 can be averaged over the present sample time and several previous sample times to provide a weighted comparison between such averaged signals and the sweep signals in the present frame time. By averaging the noises in the stored signals over the present frame time and several previous frame times, noises can be eliminated or at least minimized in the comparison provided by the comparator 74.

The signals from the analog-to-digital converter 78 may also be introduced to stages 98 for providing an indication on a display such as a raster scan display of the signals stored in the memory storage 80 or in the memory storage 84. The stage 98 operates to produce a sweep in accordance with the parameters represented by the pulses 20. The sweep has an amplitude at each instant during the sweep in a conventional manner in accordance with the characteristics of the signals provided by the memory storage 80 or by the memory storage 84.

The stages 98 may be constructed in a conventional manner to produce a sweep in one coordinate direction in a display tube such as an oscilloscope and to provide an amplitude display in the tube in a second coordinate direction.

The sweep may be produced vertically rather than horizontally. This may be accomplished by utilizing a standard television display tube and by rotating the display tube or deflection yoke through an angle of 90° from its normal position. In this way, the vertical sweep in the display tube represents the different frequencies and the horizontally illuminated dots represent the amplitude, at these different frequencies, of the sweep signal in the cable 72.

The stages 98 also include circuitry for brightening particular portions of the visual display.

Such circuitry may be constructed in a conventional manner to control the brightness of the display at each instant.

For example, the portions of the display at particular frequencies during the horizontal sweep can be visually brightened in accordance with the operation of the microprocessor 65, to indicate the amplitudes of the sweep signals, or the weighted sweep signals, at these positions. Similarly, a horizontal line for amplitude band can be brightened, under the control of the microprocessor 65, to indicate all of the frequency positions at which the amplitudes of the difference signals fall within such bands.

The controlled brightening of the image at selected positions along the sweep is fully disclosed in U.S. Pat. No. 4,165,506 issued on Aug. 21, 1979, to Antoon H.

Brands and Jouke Gietema and U.S. Pat. No. 3,955,120 issued on May 4, 1976, to Heinrich Jurgensen.

The system constituting this invention provides certain important advantages. It provides digital pass signals 22 and 24 separated by one frame time to provide a comparison in the comparator 74 of the cable signals in two successive frame times. In this way, the pass signals provide a precise and simple basis for storing in the memory storage 80 only the sweep signals passing through the cable 72 in the second frame time. Furthermore, the system provides a plurality of digital signals representing different parameters which define the sweep. By providing such digital signals to represent the different parameters, the sweep represented by such parameters can be defined and produced at the transmitter and at the receiver with more precision than in the prior art. As a result, the stages 98 can be controlled to provide a sweep, for purposes of display at the receiver, with the same precision as the production of the sweep signals at the transmitter for passage through the cable 72.

The system constituting this invention also offers other advantages of some importance. For example, it provides for an averaging on a weighted basis of the information represented by the sweep signals passing through the cable 72 in a plurality of progressive frame times so that the effects of noise can be minimized. The system additionally provides for a visual display in vertical windows of the difference signals for particular frequencies during the sweep or horizontal displays of the particular amplitudes in the difference signals.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination for use at a receiver for monitoring and analyzing the quality of signals passing through a cable in successive television frame times where television signals for the successive time frames are passed through the cable and digital signals are provided in the cable in serial form to represent information relating to the parameters of a frequency sweep and where first and second pass signals are provided in the cable to define successive frame times and where sweep signals are provided in the cable in synchronism with the second pass signal in the pair and where the digital signals, the pass signals and the sweep signals are transmitted through the cable to the receiver,
   first means for recovering the pass signals, the sweep signals, the digital signals and the television signals in the successive frames,
   second means for storing representations of the recovered signals in the successive frame times,
   third means responsive to the second pass signal for passing the representations of the recovered signals from the second means, and
   fourth means responsive to the recovered signals from the first means and the representations of the recovered signals from the third means for subtracting such recovered signals to recover the sweep signals.

2. The combination set forth in claim 1 wherein
   the fourth means is coupled to the second means to introduce to the second means the sweep signals recovered by the fourth means, and
   means are included for averaging on a weighted basis the sweep signals introduced to the second means in the successive frame times.

3. The combination set forth in claim 2 wherein
   the first means includes means for performing checks of parity and sums on the serial digital signals before the operation of the fourth means in recovering the sweep signals.

4. The combination set forth in claim 1 wherein
   the second means is operative only during the period between the first and second pass signals and the fourth means is operative for a particular period of time after the production of the second pass signal where such particular period is at least equal to the period for the production of the sweep signals.

5. The combination set forth in claim 4, including,
   gate means associated with the second means for passing the stored representations of the recovered signals for each of the successive frame time in synchronism with the introduction of the representations of the recovered signals from the third means for each of the successive frame times.

6. The combination set forth in claim 1 wherein
   the fourth means is operative to receive the signals from the first means in each of the successive frame times in synchronism with the recovered representations of the signals from the third means for each of the successive frame times.

7. In combination for use at a receiver for monitoring and analyzing the quality of signals passing through a cable in successive television frame times where television signals for the successive frame times are passed through the cable and digital signals are provided in the cable in serial form to represent information relating to the parameters of a frequency sweep and first and second pass signals are provided in the cable to indicate successive frame times of the signals and a sweep signal is provided in the cable in synchronism with the second pass signal,
   first means responsive to the serial digital signals for providing a parity check,
   second means responsive to the parity check and the first pass signal in each pair for providing a representation of the television signals from the cable in first frame times,
   third means responsive to the parity check and the second pass signal in each pair for providing representations of the television and sweep signals from the cable in second frame times subsequent to the first frame times, and
   means responsive to the signals from the second and third means for comparing the reresentations of signals from the second and third means in the first and second frame times to obtain a cancellation of the television signals from the second and third means in the first and second frame times and a recovery of the sweep signals.

8. The combination set forth in claim 7, including,
   means responsive to the sweep signals for providing a visual indication of the quality of response of the cable to signals at the different frequencies in the sweep.

9. The combination set forth in claim 8 wherein
   means are included for providing visual indications of the quality of response of the cable in any particular portion of the sweep.

10. The combination set forth in claim 9, including, means for storing the representations of the television signals in the first frame times, and gate means operatively coupled to the storing means for synchronizing the introduction to the comparing means of the representation of the television signals in the first frame times and the representation of the television and sweep signals in the second frame times.

11. The combination set forth in claim 8 wherein means are included for storing the respresentations of the television signals in digital form and wherein such digital signals are recirculated and are converted into analog form in each recirculation.

12. The combination set forth in claim 8, including, gate means operative to synchronize the introduction to the comparing means of the representations of the television signals in the first frame times and the representations of the television and sweep signals in the second frame times.

13. In combination at a receiver for monitoring and analyzing the quality of telelvision signals passing through a cable in successive television frame times where digital signals are provided in the cable in serial form to represent information relating to the parameters of a frequency sweep and first and second pass signals are provided in the cable upon each production of the digital signals to indicate successive time frames of the signals and a sweep signal is provided in the cable upon the occurrence of the first and second pass signals.

first means for detecting the signals in the cable to receive the television signals, the digital signals and the pass signals, second means responsive to the digital signals for providing a parity and sum check, third means responsive to the parity and sum check and the first pass signal for passing the television signals from the cable in first frame times after the production of the first pass signal, fourth means responsive to the parity and sum check and the second pass signal for providing the television and sweep signals from the cable in second frame times after the first frame times and after the production of the second pass signal, fifth means responsive to the signals from the third and fourth means for obtaining the difference between such signals to recover the sweep signals from the fourth means, and sixth means responsive to the recovered sweep signals for processing such recovered sweep signals to provide an indication of the quality of the signals in the cable at the different frequencies in the sweep.

14. The combination set forth in claim 13 wherein seventh means are included for weighting the recovered sweep signals in a particular relationship through at least a pair of the successive television frame times and wherein the sixth means are responsive to the weighted signals for processing such signals to eliminate the effect of noises in providing an indication of the quality of the signals in the cable at the different frequencies in the sweep.

15. The combination set forth in claim 14 wherein the third means are operative only in the period between the first and second pass signals to pass the television signals in the cable and wherein means are included in the third means for storing the representation of such signals to introduce such representation of such signals to the fifth means in synchronism with the introduction of the television and sweep signals by the fourth means to the fifth means.

16. The combination set forth in claim 15, including, gate means responsive to the second pass signal and the television signals from the third means for introducing such television signals to the fifth means in synchronism with the television and sweep signals introduced from the fourth means to the fifth means.

17. The combination set forth in claim 13 wherein means are included for converting to digital form the television signals provided by the third means and for storing such digital signals and for recirculating such stored signals and converting such recirculated signals to analog form for introduction to the fifth means in synchronism with the television and sweep signals provided by the fourth means.

18. The combination set forth in claim 17 wherein the fifth means include means for providing a visual display of the recovered sweep signals, and means for directing attention in the visual display to the recovered sweep signals in individual portions of the visual display.

19. In combination for monitoring and analyzing the quality of a cable in transmitting television signals through the cable in successive television frame times, means for providing carrier signals, means for providing control information indicative of a sweep between a particualr start frequency and a particular stop frequency in a particular time duration and at a particular repetition rate, means for converting the control information into serial digital data and for providing first and second pass signals representing in time separation the passage of the television signals through the cable in the successive television frame times, means for producing a sweep signal upon the production of the second pass signal and in accordance with the control information, means for combining the carrier signals with the digital data in serial form and with the pass signals and the sweep signals for introducing such combined signals into the television cable, means for receiving the combined signals passing through the television cable, means for demodulating the received signals to recover the digital data in serial form and the pass signals, means for processing the recovered serial digital data to provide a parity and sum check, means responsive to the parity and sum check and the first pass signal for passing the television signals in the cable in the television frame time between the pass signals, means responsive to the parity and sum check and the second pass signal for passing the television and sweep signals in the frame after each such second pass signal, and mean responsive to the operation of the last two mentioned means for comparing the signals from such last two mentioned means to recover the sweep signals in the cable for obtaining an indication of the quality of response of the cable at the different frequencies in the sweep signal.

20. The combination set forth in claim 19 wherein means responsive to the first pass signal provides for the storage of the representations of the television signals in the cable in the television frame times between the passage of the first and second pass signals and the comparing means compares the stored signals from the storing means and the signals provided in the cable after the second pass signal.

21. The combination set forth in claim 19 wherein
means are provided for storing representations of the sweep signals in the cable on a weighted basis in a number of successive frames and wherein the comparing means is responsive to the sweep representations of the signals stored on the weighted basis to eliminate the effects of noise in the signals provided by the comparing means.

22. The combination set forth in claim 21 wherein
means are included for storing representations of the television signals provided from the cable in the first frame times, and
means are included for introducing the stored representations of the television signals to the comparing means in synchronism with the television and sweep signals in the cable in the second frame times.

23. The combination set forth in claim 22 wherein
the storing means stores the television signals in the first frame times in digital form, and
the introducing means converts into an analog form the stored television signals in digital form.

24. In combination for monitoring and analyzing the quality of a cable in transmitting television signals through the cable in successive television frame times,
means for providing carrier signals,
means for providing control information indicative of a sweep between a particular start frequency and a particular stop frequency in a particular time duration and at a particular repetition rate,
means for converting the control information into serial digital data and for providing first and second pass signals representing in time separation the passage of the television signals through the cable in the successive television frame times,
means for producing a sweep signal through a particular range of frequencies upon the production of the second pass signal and in accordance with the control information, and
means for combining the carrier signals, the digital data in serial form, the pass signals and the sweep signals for introducing such combined signals into the television cable.

25. The combination set forth in claim 24 wherein
the means for producing the sweep signal includes means for producing a ramp voltage in accordance with the control information indicative of the particular start frequency, the particular stop frequency, the particular time duration and the particular repetition rate and further includes a voltage controlled oscillator for producing a frequency at each instant in accordance with the voltage in the ramp.

26. The combination set forth in claim 25 wherein
means are provided for regulating the gain of the carrier signals and
means are provided for preventing the production of signals at individual frequencies in the particular range of frequencies.

27. The combination set forth in claim 24, including,
means for receiving the combined signals passing through the television cable,
means for demodulating the received signals to recover the pass signals,
means responsive to the first pass signal for storing the television signals in the frame after the first pass signal,
means responsive to the second pass signal for passing the television and sweep signals in the frame after the second pass signal, and
means for comparing the stored television signals and the television and sweep signals from the last mentioned means to obtain a recovered sweep signal in the particular range of frequencies.

28. The combination set forth in claim 27, including,
means responsive to the recovered sweep signal for providing an indication of the quality of the signal in the cable at the different frequencies in the particular range.

29. The combination set forth in claim 27, including,
gate means responsive to the second pass signal and the television signals in the frame after the first pass signals for synchronizing the introduction of such signals to the comparing means with the television and sweep signals in the frame after the second pass signal.

* * * * *